United States Patent
Kobayashi et al.

(10) Patent No.: US 6,238,615 B1
(45) Date of Patent: May 29, 2001

(54) ORIENTATED GEL MOLDING METHOD OF POLYOLEFIN BASED RESIN COMPOSITION

(75) Inventors: Toshiaki Kobayashi, Nara; Kiyoshi Sadamitsu, Yawata, both of (JP)

(73) Assignee: New Japan Chemical Co., Ltd. (JP)

( * ) Notice: Subject to any disclaimer, the term of this patent is extended or adjusted under 35 U.S.C. 154(b) by 0 days.

(21) Appl. No.: 09/341,186

(22) PCT Filed: Nov. 2, 1998

(86) PCT No.: PCT/JP98/04959

§ 371 Date: Jul. 6, 1999

§ 102(e) Date: Jul. 6, 1999

(87) PCT Pub. No.: WO99/24496

PCT Pub. Date: May 20, 1999

(30) Foreign Application Priority Data

Nov. 6, 1997 (JP) .................................................... 9-322171
Sep. 19, 1998 (JP) ................................................. 10-271056
Oct. 2, 1998 (JP) ................................................. 10-281149

(51) Int. Cl.$^7$ .............................. B29B 13/04; B29C 67/24
(52) U.S. Cl. ......................... 264/537; 264/539; 264/540; 264/140; 264/211; 264/328.17; 264/331.15; 524/58; 524/108; 524/109; 524/110
(58) Field of Search ............................. 264/78, 500, 523, 264/537, 539, 540, 140, 176.1, 211, 319, 328.1, 328.14, 328.17, 330, 331.11, 331.15; 524/58, 107, 108, 109, 110

(56) References Cited

U.S. PATENT DOCUMENTS

| | | | | |
|---|---|---|---|---|
| 5,001,176 | * | 3/1991 | Nakazima | 524/48 |
| 5,015,684 | * | 5/1991 | Kobayashi et al. | 524/108 |
| 5,135,975 | * | 8/1992 | Rekers | 524/108 |
| 5,198,484 | * | 3/1993 | Mannion | 524/108 |

FOREIGN PATENT DOCUMENTS

| | | |
|---|---|---|
| 496260 | 7/1992 | (EP) . |
| 5-128915 | 5/1993 | (JP) . |
| WO 95/25140 | 9/1995 | (WO) . |

* cited by examiner

*Primary Examiner*—Leo B. Tentoni
(74) *Attorney, Agent, or Firm*—Larson & Taylor, PLC

(57) ABSTRACT

The present invention provides method of molding a polyolefin-based resin comprising the steps of dissolving at least one dibenzylidene sorbitol compound in a molten polyolefin resin, cooling the molten resin to a temperature not higher than the sol-gel transition temperature during the cooling cycle to form network-like crystals of the dibenzylidene sorbitol compound, and molding the resulting resin composition at a temperature not lower than the melting temperature of the polyolefin-based resin but not higher than the sol-gel transition temperature during the heating cycle; and a polyolefin resin molded article obtainable by this molding method.

16 Claims, 2 Drawing Sheets

ORIENTATED GEL MOLDING METHOD OF POLYOLEFIN BASED RESIN COMPOSITION

FIELD OF THE INVENTION

The present invention relates to novel methods of molding crystalline polyolefin resins, in particular, orientated gel molding methods capable of giving, at a high molding rate, molded articles having high rigidity (flexural modulus) and high surface gloss, as well as molded articles obtainable by the methods.

PRIOR ART

Widely known, practically usable nucleating agents for crystalline polyolefin resins include dibenzylidene sorbitol compounds (hereinafter abbreviated as "DBS compounds") capable of attaining the highest degree of transparency, which were originally invented in Japan and spread worldwide; shell nucleating agents; and rigidity-imparting nucleating agents such as organic phosphoric acid ester salts, talc and the like. The DBS compounds are of solution type, while the shell nucleating agents and the rigidity-imparting nucleating agents are of dispersion type.

According to the research of Fujiyama et al, when a polypropylene resin composition containing 4-methyl-substituted dibenzylidene sorbitol as a nucleating agent is injection-molded at several resin temperatures in the sol temperature range, i.e., at a resin temperature which are equal to or higher than the sol-gel transition temperature during the heating cycle, the flexural modulus of the obtained molded article increases gradually and linearly with a decrease in the resin temperature. This tendency can be found also with respect to other nucleating agents, such as talc, calcium carbonate and shell nucleating agents. Further, the flexural modulus values of polypropylene resin molded articles prepared using these nucleating agents are similar to one another (Fujiyama et al., J. Appl. Polym. Sci., 42,2739 (1991)). However, no research has been done on molding methods wherein the resin molding temperature is set in the gel temperature range (the temperature range in which the resin is in a gel form).

On the other hand, polyolefins containing a DBS compound as a nucleating agent are usually molded at a temperature higher than the sol-gel transition temperature during the heating cycle, and at the moment, no proposals have been made on molding methods performed paying attention to the presence or absence of network-like crystals.

As a rigidity-imparting nucleating agent, "NA-11" (trade name, product of Adeka Argus Chemical Co., Ltd., which is an organic phosphoric acid ester salt, is particularly excellent. However, this nucleating agent causes metal exchange reaction during molding, and sometimes fails to achieve the desired results. Further, unlike solution type nucleating agents, dispersion type nucleating agents are insoluble in resins and difficult to uniformly disperse therein, and therefore they are likely to remain as undispersed matter in the resins. If resins containing such undispersed matter are molded by a method comprising an orientation step, they are liable to be unevenly oriented or broken, resulting in the decrease in the stability of quality or in the yield. Accordingly, the dispersion type nucleating agents are difficult to use because of their narrow application range.

The field of polyolefin resin application is expanding year after year. As the field expands, there are increasing demands, in the fields of automobile parts, electric parts, mechanical parts and other industrial parts, for polyolefin resin molded articles with a still higher rigidity, including those which may be usable as a substitute for engineering plastic resins, as well as for unreactive, high-performance, easily usable nucleating agents of solution type which enable production of such molded articles. However, a high-performance rigidity-imparting nucleating agent which can satisfy such demands has not been found so far. Moreover, no proposals have been made on novel molding methods capable of remarkably improving the rigidity of polyolefin resins by modifying the resin with use of nucleating agents.

DISCLOSURE OF THE INVENTION

An object of the present invention is to provide a novel and useful molding method for imparting excellent rigidity to polyolefin resin molded articles.

In view of the above situations, the present inventors carried out extensive research, focusing on the fact that known nucleating agents, DBS compounds, are self-organized in molten polyolefin resin and form isotropic network-like crystals by sol-gel transition so that the polyolefin resin becomes gel [Kobayashi et al., Journal of the Japanese Rheology Society, 18, 44 (1990)].

Consequently, we developed a novel molding method comprising the step of orientating network-like crystals formed in a molten polyolefin resin in the direction of the resin flow, without dispersing on molecular level (dissolving) the network-like crystals again, i.e., at a temperature in the gel temperature range, to thereby cause crystallization of the polyolefin resin in an orientated manner (this process will be hereinafter referred to as "orientated gel molding method"). As a result, we succeeded in remarkably increasing rigidity of polyolefin resin molded articles and attaining a high molding rate and excellent surface gloss. The present invention has been accomplished based on these findings.

The orientated gel molding method, i.e., a novel method of molding a polyolefin resin composition according to the present invention, is characterized by molding a molten polyolefin resin composition containing network-like crystals of at least one dibenzylidene sorbitol compound represented by the formula (1) (namely a composition comprising a molten polyolefin resin and network-like crystals of the dibenzylidene sorbitol compound formed in the molten polyolefin resin):

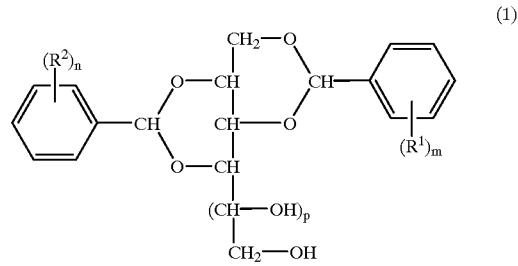

(1)

wherein $R^1$ and $R^1$ are the same or different and each represent a hydrogen atom, a $C_1$–$C_4$ alkyl group, a $C_1$–$C_4$ alkoxy group or a halogen atom; m and n each represent 1 to 5; p is 0 or 1; when m is 2, the two $R^1$'s may optionally be taken together with the benzene ring to which they are attached to form a tetralin ring; and when n is 2, the two $R^2$'s may optionally be taken together with the benzene ring to which they are attached to form a tetralin ring.

Specifically, the method of the invention is characterized in that it comprises the steps of molding a molten polyolefin resin composition containing network-like crystals of at least one dibenzylidene sorbitol compound (DBS compound) represented by the formula (1) (i.e., a composition comprising a molten polyolefin resin and network-like crystals of the dibenzylidene sorbitol compound formed in the molten polyolefin resin), so as to orientate the network-like crystals in the direction of the flow of the molten resin composition by the shearing force generated by the molding; and cooling the molten polyolefin resin composition to cause the resin to crystallize in an orientated manner.

According to the present invention, the polyolefin crystallizes along the network structure of the dibenzylidene sorbitol compound crystals, so that the polyolefin resin also crystallizes in an orientated manner.

MD stands for the machine (injection) direction of the test piece; TD for the transverse direction; and ND for the normal direction.

DETAILED DESCRIPTION OF THE INVENTION

More specifically, the orientated gel molding method of the invention can be carried out, for example, as follows.

First, at least one DBS compound represented by the formula (1) is dissolved in a molten polyolefin resin, and then the melt is cooled to a temperature not higher than the sol-gel transition temperature during the cooling cycle (hereinafter referred to as "$T_{fg}$, C") to form isotropic, randomly orientated network-like crystals of the DBS compound. The composition may be further cooled to crystallize the molten polyolefin resin, and pelletized. The pellets thus obtained contain isotropic, randomly orientated network-like crystals of the DBS compound.

Subsequently, the resin composition is heated again, and molded by, for example, a method comprising an injection or extrusion step to orientate the network-like crystals of the DBS compound, at a resin temperature not lower than the melting temperature of the polyolefin resin but not higher than the sol-gel transition temperature during the heating cycle of the polyolefin resin (hereinafter referred to "$T_{fg}$,H") (i.e., at a resin temperature in the gel temperature range) while maintaining the DBS compound in the form of the network-like crystals.

Herein, the sol-gel transition temperature during the cooling cycle ($T_{fg}$,C) and the sol-gel transition temperature during the heating cycle ($T_{fg}$,H) are defined as follows. That is, the DBS compound represented by the formula (1) forms thermoreversible network-like crystals in the molten polyolefin resin, and, as the result, the storage shear modulus (G') of the molten polyolefin resin containing the DBS compound changes discontinuously as a function of temperature. The temperature at which G' of the molten polyolefin resin containing the DBS compound begins to rise discontinuously during the cooling cycle due to the formation of the network-like crystals is defined as $T_{fg}$,C, and the temperature at which G' becomes, during the heating cycle, equal to G' of the polyolefin resin itself containing no such DBS compound, as a result of decrease in G' due to the melting of the network-like crystals is defined as $T_{fg}$,H.

Figure 1:
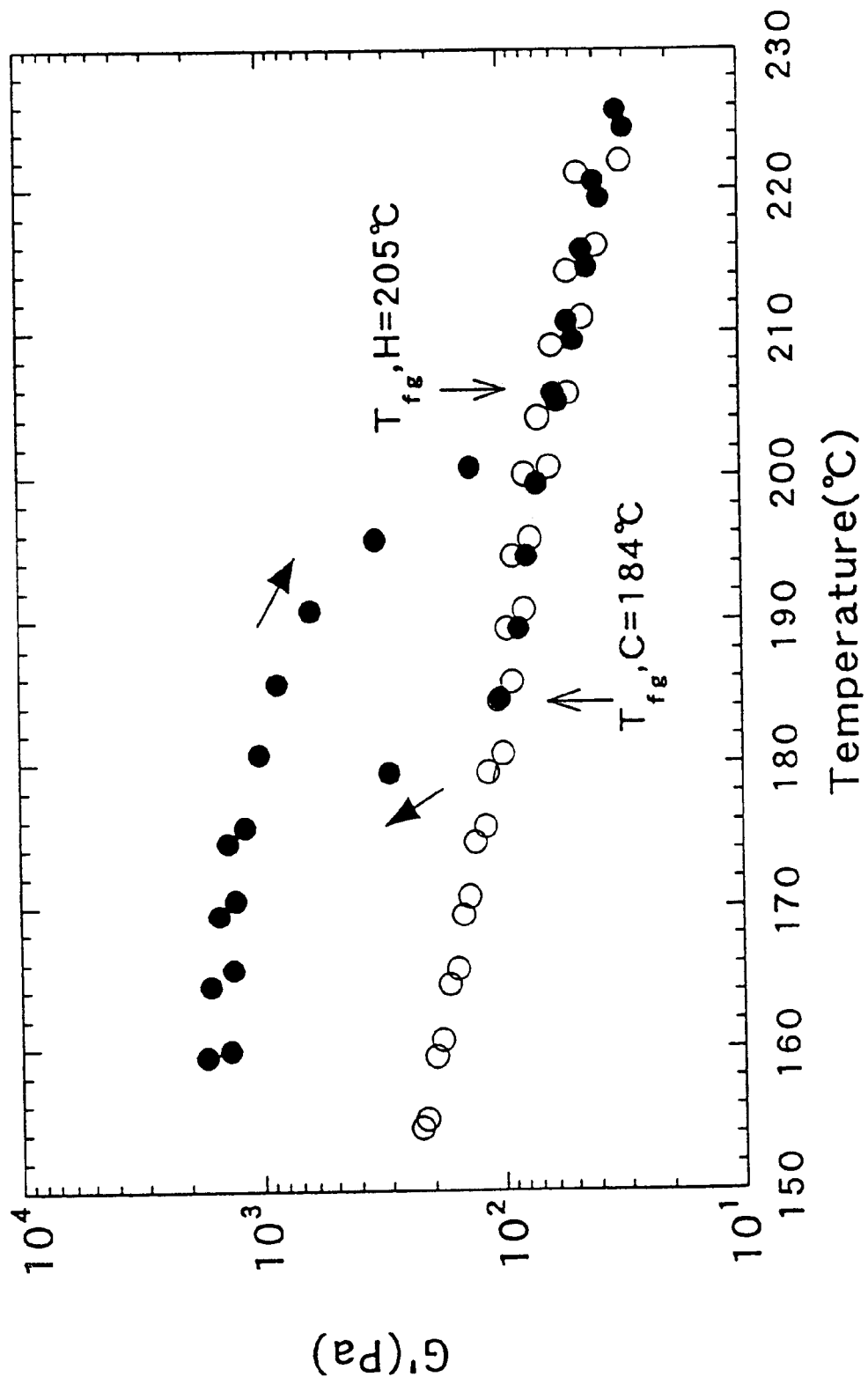
FIG. 1 is a graph showing the temperature dependence of the storage shear modulus (G') of a block polypropylene resin containing 0.4 weight part of Gel All MD (solid circle ●) and the temperature dependence of G' of the block polypropylene resin itself (circle ○).

For example, referring to the graph (FIG. 1, angular velocity ω=0.44 rad/sec) showing the temperature dependence of G' of a polypropylene resin composition containing 0.4 wt. part of 1,3:2,4-bis-O-(4-methylbenzylidene)sorbitol (tradename "Gel All MD", product of New Japan Chemical Co., Ltd.) per 100 wt. parts of a polypropylene resin, $T_{fg}$,C, i.e., the temperature at which G' begins to rise discontinuously due to the formation of the network-like crystals during the cooling cycle is 184° C., and $T_{fg}$,H, i.e., the temperature at which G', after decreasing due to the melting of the network-like crystals during the heating cycle, becomes equal to G' of the polyolefin resin as such is 205° C.

It is also possible to determine $T_{fg}$,H by a simple method of visual inspection. For example, a molten polyoplefin resin containing network-like crystals of the DBS compound is translucent because of light scattering. If the molten resin is further heated, the network-like crystals melt due to the sol-gel transition and the molten resin changes from being translucent to being transparent. The temperature at which the resin becomes transparent is $T_{fg}$,H.

For example, when molding polypropylene resin pellets containing network-like crystals of Gel All MD (0.4 wt. part) and a polypropylene resin (100 wt. parts), the melted polypropylene resin composition is in a gel form at temperatures ranging from about 160° C. (at which the resin melts) to 205° C., because of the presence of the network-like crystals of Gel All MD. In such a temperature range, the composition is translucent because the penetrating light is scattered by the network-like crystals. At a temperature higher than 205° C., i.e., the sol-gel transition temperature ($T_{fg}$,H), the network-like crystals of Gel All MD melt, and the polypropylene resin composition becomes in the form of sol. At that point, the molten resin becomes transparent.

The "gel temperature range" is a temperature range from the melting temperature of the resin to $T_{fg}$,H. For example, in FIG. 1, the gel temperature range is from 160° C. which is a melting temperature of the block polypropylene copolymer used to $T_{fg}$,H (250° C.). In gel temperature range, the polypropylene resin composition containing Gel All MD is in a gel form because of the presence of the network-like crystals of Gel All MD.

According to conventional molding methods comprising the step of injecting or extruding a polyolefin resin containing a DBS compound as a. clarifying nucleating agent, the DBS compound is dispersed as uniformly as possible or dispersed on molecular level (dissolved) in a molten polyolefin resin, at a temperature not lower than or in the vicinity of the sol-gel transition temperature during the heating cycle ($T_{fg}$,H), followed by pelletization if so desired, and then the polyolefin resin composition is injection- or extrusion-molded at a temperature higher than $T_{fg}$,H.

In the conventional methods, the injection or extrusion molding is performed without paying attention to the presence or absence of the network-like crystals of the DBS compound. Accordingly, the network-like crystals of the DBS compound are formed when the DBS compound-containing molten polyolefin resin composition is cooled, but the crystals are melted again in the injection or extrusion step carried out at a temperature not lower than $T_{fg},H$. That is, the composition is molded in such a state that the network-like crystals are melted (eliminated), i.e., in a sol state.

According to such conventional molding methods, the molten polyolefin resin substantially does not contain network-like crystals of the DBS compound at the end of the die or nozzle of the molding machine. It is assumed that since the nucleating agent DBS compound is used in conventional methods for the purpose of improving transparency of the resin, the nucleating agent is finely dispersed by the above molding methods in order to minimize the light scattering.

As the result, the network-like crystals of the DBS compound are formed only after the injection or extrusion step, by cooling the molten polyolefin resin to a temperature which is equal to or lower than the sol-gel transition temperature during the cooling cycle ($T_{fg},C$). Said network-like crystals are isotropic, and are not orientated. Said isotropic network-like crystals function as the clarifying nucleating agent to the polyolefin resin.

On the other hand, the orientated gel molding method of the present invention is characterized by orientating the network-like crystals in a certain direction. That is, the network-like crystals of the DBS compound formed in the polyolefin resin are orientated in the direction of the resin flow in the molding machine, by injecting or extruding the resin at a temperature not lower than the melting temperature of the resin but not higher than $T_{fg},H$ (in the gel temperature range).

According to this molding method, the molten polyolefin resin at the end of the die or nozzle of the molding machine is not completely transparent but., translucent owing to light scattering, due to the presence of the network-like crystals of the DBS compound. It is presumed that the polyolefin crystals grow on the network-like crystals of the DBS compound, which are orientated in the flow direction of the resin and which serve as the nucleus for crystallization, to thereby form polyolefin crystals having a high degree of orientation, with the result that the obtained molded articles have remarkably improved mechanical properties such as rigidity. However, the details of the mechanism remains to be elucidated.

The fact that the polyolefin resin crystals are orientated in the polyolefin resin molded article obtainable by the orientated gel molding method of the invention can be confirmed by, for example, wide-angle X-ray diffraction of the molded article, since the diffraction patterns in the Through and Edge directions show similar arcuate Debye rings, whereas the diffraction pattern in the End direction shows an isotropic Debye ring.

The present invention will be described below in detail. Dibenzylidene sorbitol compound represented by the formula (1)

Specific examples of DBS compounds represented by the formula (1) include:
1,3:2,4-O-dibenzylidene sorbitol,
1,3:2,4-bis-O-(4-methylbenzylidene)sorbitol,
1,3:2,4-bis-O-(4-ethylbenzylidene)sorbitol,
1,3:2,4-bis-O-(4-isopropylbenzylidene)sorbitol,
1,3:2,4-bis-O-(2,4-dimethylbenzylidene)sorbitol,
1,3:2,4-bis-O-(3,4-dimethylbenzylidene)sorbitol,
1,3:2,4-bis-O-(3,5-dimethylbenzylidene)sorbitol,
1,3:2,4-bis-O-(2,5-dimethylbenzylidene)sorbitol,
1,3:2,4-bis-O-(2,4,5-trimethylbenzylidene)sorbitol,
1,3:2,4-bis-O-(3,4,5-trimethylbenzylidene)sorbitol,
1,3:2, 4-bis-O-(4-methoxybenzylidene)sorbitol,
1,3:2,4-bis-O-(4-chlorobenzylidene)sorbitol,
1,3:2,4-bis-O-(tetrahydronaphthylidene)sorbitol, and
other 1,3:2,4-O-bis DBS compounds (symmetric diacetals); and
1,3-O-benzylidene-2,4-O-(3,4-dimethylbenzylidene) sorbitol,
1,3-O-(3,4-dimethylbenzylidene)-2,4-O-benzylidene sorbitol,
1,3-O-benzylidene-2,4-O-(2,4-dimethylbenzylidene) sorbitol,
1,3-O-(2,4-dimethylbenzylidene)-2,4-O-benzylidene sorbitol, and other asymmetric diacetals.

Among them, recommended are 1,3:2,4-bis-O-(3,4-dimethylbenzylidene)sorbitol, 1,3:2,4-bis-O-(2,4-dimethylbenzylidene)sorbitol, 1,3:2,4-bis-O-(4-methylbenzylidene)sorbitol, 1,3:2,4-bis-O-(4-ethylbenzylidene)sorbitol, 1,3:2,4-bis-O-(4-chlorobenzylidene)sorbitol, 1,3:2,4-bis-O-(2,4,5-trimethylbenzylidene)sorbitol and 1,3:2,4-bis-O (tetrahydronaphthylidene)sorbitol.

All of the above DBS compounds are known or can be readily prepared by known methods.

Other additives

The polyolefin resin composition and/or the DBS compound of the formula (1) for use in the invention may contain, where necessary, various additives such as alkaline compounds, nonionic surfactants and/or anionic surfactants, and melting point depressing agents.

(a) Alkaline compounds

Where necessary, a small amount [e.g., 50 ppm to 1 wt. % relative to the DBS compound of the formula (1)] of an alkaline compound may be added to the molten polyolefin resin and/or the DBS compound of the formula (1) to thereby stabilize the DBS compound. Such stabilization is preferable, since the stabilization tends to elevate $T_{fg},H$ so that the temperature range in which the orientated gel molding can be carried out can be expanded toward higher temperatures. At the same time, the use of an alkaline compound also inhibits the DBS compound from decomposing during molding.

Examples of the alkaline compounds include sodium hydroxide, potassium hydroxide and like inorganic alkalis; sodium, potassium, lithium and like alkali metal salts and calcium, magnesium and like alkaline earth metal salts of fatty acids such as stearic acid, hydroxystearic acid, oleic acid, behenic acid and the like, and of carboxylic acids such as citric acid, lactic acid, lactic acid dimer stearate, succinic acid, benzoic acid, p-tert-butylbenzoic acid, ethylenediamine tetraacetic acid and the like. Among them, preferred are lithium stearate, sodium benzoate and sodium p-tertbutylbenzoate.

(b) Nonionic surfactants and/or anionic surfactants

The molten polyolefin resin and/or the compound of the formula (1) may contain a nonionic surfactant and/or an anionic surfactant, if so desired. The surfactant, when employed, is used in a proportion of preferably 0.5 to 30 wt. parts, more preferably 1 to 10 wt. parts, per 100 wt. parts of the DBS compound represented by the formula (1).

Useful as the nonionic surfactant and/or anionic surfactant is at least one surfactant selected from the group consisting of ether-type, ether ester-type, ester-type and nitrogen-containing nonionic surfactants and carboxylic acid salt-type and phosphoric acid ester salt-type anionic surfactants. These surfactants can be used in combination, and may be added to the molten polyolefin resin. Use of the surfactant is preferable, because it not only improves dispersibility of the DBS compound in the polyolefin resin, but also increases the rigidity of the polyolefin resin molded articles by a synergetic effect of the surfactant and the DBS compound.

Examples of the ether-type nonionic surfactants include polyoxyethylene (4–50 moles) alkyl ($C_{12}$–$C_{22}$) ethers, polyoxyethylene (4–50 moles) alkyl ($C_{12}$–$C_{22}$) phenyl ethers, polyoxyethylene (4–50 moles) alkyl ($C_3$–$C_{22}$) naphthyl ethers, polyoxyethylene (4–50 moles) cholesterol ethers, polyoxyethylene (4–50 moles) phytosterol ethers, polyoxyethylene (4–50 moles) lanolin ethers, polyoxyethylene (4–50 moles) polyoxypropylene (4–50 moles) block polymers, polyoxyethylene (4–50 moles) polyoxypropylene (4–50 moles) alkyl ($C_{12}$–$C_{22}$) ethers, and the like. Among them, polyoxyethylene (4–50 moles) alkyl ($C_{12}$–$C_{22}$) ethers are recommended.

Examples of the ether ester-type noninonic surfactants include polyoxyethylene (4–50 moles) glycerin fatty acid ($C_8$–$C_{22}$) esters, polyoxyethylene (4–50 moles) castor oil, polyoxyethylene (4–50 moles) hydrogenated castor oil, polyoxyethylene (4–50 moles) sorbitan fatty acid ($C_8$–$C_{22}$) esters, polyoxyethylene (4–50 moles) sorbitol fatty acid ($C_8$–$C_{22}$) esters, and the like. Among them, polyoxyethylene (4–50 moles) glycerin fatty acid ($C_8$–$C_{22}$) esters are recommended.

Examples of the ester-type nonionic surfactants include polyethylene glycol (4–50 moles) fatty acid ($C_8$–$C_{22}$) esters, fatty acid ($C_8$–$C_{22}$) monoglycerides, polyglycerin (4–50 moles) fatty acid ($C_8$–$C_{22}$) esters, sorbitan fatty acid ($C_8$–$C_{22}$) esters, polypropylene glycol (4–50 moles) fatty acid ($C_8$–$C_{22}$) esters, sucrose fatty acid ($C_8$–$C_{22}$) esters, and the like. Among them, fatty acid ($C_8$–$C_{22}$) monoglycerides are recommended.

Examples of the nitrogen-containing nonionic surfactants include fatty acid ($C_8$–$C_{22}$) monoalkanol ($C_1$–$C_4$) amides, fatty acid ($C_8$–$C_{22}$) dialkanol ($C_1$–$C_4$) amides, polyoxyethylene (4–50 moles) fatty acid ($C_8$–$C_{22}$) amides, polyoxyethylene (4–50 moles) alkyl ($C_7$–$C_{22}$) amines, alkyl ($C_7$–$C_{22}$) amine oxides and the like. Among them, fatty acid ($C_8$–$C_{22}$) monoalkanol ($C_1$–$C_4$) amides and fatty acid ($C_8$–$C_{22}$) dialkanol ($C_1$–$C_4$) amides are preferred.

Examples of carboxylic acid salt-type anionic surfactants include sodium salts or potassium salts of fatty acids ($C_8$–$C_{22}$), N-acyl($C_8$–$C_{22}$)-N-methylglycines, N-acyl ($C_8$–$C_{22}$)-N-methyl-β-alanines and N-acyl($C_8$–$C_{22}$) glutamic acids, among which sodium salts and potassium salts of N-acyl($C_8$–$C_{22}$)-glutamic acids are recommended.

Examples of the phosphoric acid ester salt-type anionic surfactants include sodium salts and potassium salts of alkyl ($C_8$–$C_{18}$) ether phosporic acid ester and alkyl ($C_8$–$C_{18}$) phosphoric acid esters.

(c) Melting point depressing agent

Where necessary, a small amount of a melting point depressing agent [for example, 0.05 to 20 wt. % relative to the DBS compound represented by the formula (1)] may be added to the DBS compound of the formula (1) to thereby reduce the melting point of the DBS compound by at least 10° C. but less than 120° C., preferably at least 40° C. but less than 120° C., more preferably at least 80° C. but less than 120° C.

This enables the DBS compound to be dispersed on molecular level (dissolved) in the polyolefin resin at a resin temperature lower than the resin temperature at which the DBS compound whose melting point is not depressed is dissolved. Moreover, the presence of the melting point depressing agent does not change $T_{fg}$,H of the polyolefin resin composition comprising the polyolefin resin and the DBS compound, and therefore the melting point depressing agent can be preferably used.

The melting point depressing agent as used herein is a compound capable of giving a composition having a melting point depressed by at least 10° C. compared with the melting point of the DBS compound as such, when said compound is blended with the DBS compound of the formula (1) in a proportion of 10 wt. % relative to the DBS compound. Specific examples of such compounds include hydroxypolycarboxylic acids, carboxylic acids, sulfonic acid salts, sulfuric acid ester salts, fatty acid aluminum salts and the like.

Examples of hydroxypolycarboxylic acids include $C_3$–$C_{22}$ di-, tri- or tetracarboxylic acids having 1 to 3 hydroxyl groups, such as tartaric acid, lactic acid, malic acid, citric acid, gluconic aid, pantothenic acid, 12-hydroxystearic acid, mandelic acid, cholic acid, β-oxynaphthoic acid, ricinoleic acid, quinic acid, shikimic acid, salicylic acid, β,β-dihydroxyhexahydrophthalic acid, and the like.

Examples of carboxylic acids include $C_3$–$C_{22}$ mono-, di-, tri- or tetracarboxylic acids having 1 to 4 carboxyl groups, such as lauric acid, tridecanoic acid, myristic acid, pentadecanoic acid, palmitic acid, heptadecanoic acid, stearic acid, isostearic acid, eicosanoic acid, behenic acid, docosanoic acid, montanic acid, benzilic acid, sorbic acid, oleic acid, linoleic acid, linolenic acid, succinic acid, glutaric acid, malonic acid, adipic acid, suberic acid, azelaic acid, sebacic acid, dodecanedioic acid, itaconic acid, tricarballylic acid, 1,2,3,4-butanetetracarboxylic acid, citrazinic acid, 1,2,3,4-cyclopentanetetracarboxylic acid, 1,4-cyclohexanedicarboxylic acid, 1,2-cyclohexanedicarboxylic acid, 4,4'-dicyclohexyldicarboxylic acid, cyclohexanetetracarboxylic acid, L-glutaminic acid, L-glutamine and the like.

Examples of sulfonic acid salts include sodium salts and potassium salts of sulfonic acids selected from alkane ($C_8$–$C_{14}$) sulfonic acids, alkyl ($C_8$–$C_{22}$) benzenesulfonic acids, alkyl ($C_8$–$C_{22}$) naphthalenesulfonic acids, alkyl ($C_8$–$C_{22}$) sulfosuccinic acids, α-olefin sulfonic acids ($C_8$–$C_{30}$) and N-acyl ($C_8$–$C_{22}$) methyltaurines.

Examples of sulfuric acid ester salts include sodium salts or potassium salts of sulfuric acid esters selected from sulfated castor oil, higher alcohol ($C_8$–$C_{12}$) sulfuric acid esters, polyoxyethylene (1–5 moles) alkyl ($C_8$–$C_{22}$) ether sulfate, polyoxyethylene (1–5 moles) alkyl ($C_7$–$C_{22}$) phenyl ether sulfate, monofatty acid ($C_8$–$C_{22}$) glyceryl sulfate and sulfuric acid esters of fatty acid ($C_8$–$C_{22}$) alkylol ($C_1$–$C_6$) amides.

Preferred examples of sulfonic acid salts include salts of alkylbenzenesulfonic acids or alkylnaphthalenesulfonic acids, in which the alkyl group has 8 to 14 carbon atoms; salts of $C_{12}$–$C_{22}$ alkanesulfonic acids or $C_{12}$–$C_{22}$ alkenesulfonic acids; and salts of dialkyl sulfosuccinates in which each of the alkyl moieties Is a $C_3$–$C_{12}$ alkyl group, cyclohexyl group, a $C_1$–$C_3$ alkyl-substituted cyclohexyl group or the like. Examples of the salts include lithium salt, sodium salt, potassium salt and like alkali metal salts; calcium salt, magnesium salt and like alkaline earth metal salts; and ammonium salt.

Preferred examples of the above sulfuric acid ester salts include salts of sulfuric acid ester of saturated or unsaturated aliphatic alcohols, and salts of sulfuric acid esters of ethylene oxide adducts of saturated or unsaturated aliphatic alcohols (the number of moles of ethylene oxide added: 1–10). The saturated or unsaturated aliphatic alcohols are, for example, those having 4 to 30, in particular 6 to 30, preferably 8 to 20 carbon atoms. The unsaturated aliphatic alcohols preferably have 1 to 3 unsaturated bonds (in particular, double bonds) within the molecule. Examples of the salts include lithium salt, sodium salt, potassium salt or like alkali metal salts, calcium salt, magnesium salt or like alkaline earth metal salts, and ammonium salt.

Examples of the fatty acid aluminum salts include mono-, di- or tri-($C_6$–$C_{30}$ fatty acid) aluminum salts, in particular di- or mono(carboxylic acid) aluminum salts, among which there may be mentioned aluminum di- or mono-pelargonate, aluminum di- or monolaurate, aluminum di- or monomyristate, aluminum di- or mono-stearate, aluminum di- or mono-oleate, etc.

As the method of depressing the melting point of the DBS compound by adding a melting point depressing agent thereto, the following method may be mentioned.

First, a slurry (having a DBS compound concentration of 1 to 60 wt. %, preferably 5 to 40 wt.*) is prepared from the DBS compound of the formula (1) and an organic solvent capable of swelling the DBS compound (e.g., a polar organic solvent such as methanol, ethanol or like $C_1$–$C_3$ lower alcohol; an aromatic hydrocarbon such as toluene or xylene; or a mixture of at least one member selected from the polar organic solvents and aromatic hydrocarbons, and at least one member selected from nhexane, heptane, nonane, decan, cyclohexane and like $C_5$–$C_{10}$ aliphatic hydrocarbons). The slurry is heated to a temperature of 20 to 200° C., preferably to a temperature in the vicinity of the reflux temperature of the organic solvent which is 100° C. or lower (for example, 60 to 100° C.), and is throughly mixed to swell the DBS compound. The melting point depressing agent is then added to and dissolved in the system so as to uniformly disperse the melting point depressing agent therein. Subsequently, while water is added as required, the organic solvent and water are evaporated off, for example, at a temperature in the range of 20 to 180° C. with stirring, for drying the system. The resulting DBS compound in which the melting point depressing agent is uniformly dispersed has a melting point lower than that of the DBS compound as such by at least 10° C. but less than 120° C. The melting point depressing agent may be added when swelling the DBS compound with the organic solvent.

Polyolefin-based resin composition

In the orientated gel molding method of the invention, a recommended proportion of the DBS compound of the formula (1) in the polyolefin-based resin is 0.05 to 7.0 wt. parts, more preferably 0.2 to 2.0 wt. parts, per 100 wt. parts of the polyolefin-based resin. If the amount is less than 0.05 wt. part, the DBS compound is dissolved in the resin under the molding conditions, making it difficult to achieve the desired results. On the other hand, a proportion exceeding 7.0 wt. parts is uneconomical, since addition of such an amount is unlikely to achieve a corresponding result.

The polyolefin-based resin for use in the invention is a stereoregular, crystalline resin. Specific examples of such resins include polyethylene-based resins, polypropylene-based resins and polybutene-based resins. With respect to these resins, there is no specific restriction on the production method, type of stereoregularity, crystallinity, kind, selection of whether at least 2 kinds of polyolefin resins are used as a blend or a single resin is used, and the molecular weight distribution of the polyolefin resins.

Examples of the polyethylene-based resins include high-density polyethylene, medium-density polyethylene, low-density polyethylene, linear low-density polyethylene and ethylene copolymers with an ethylene content of 50 wt. % or more.

Examples of polypropylene-based resins include isotactic or syndiotactic propylene homopolymers and propylene copolymers with a propylene content of 50 wt. % or more.

Examples of polybutene-based resins include isotactic or syndiotactic butene homopolymers and butene copolymers with a butene content of 50 wt. % or more.

The above copolymers may be random copolymers or block copolymers.

Comonomers which can form the above copolymers are, for example, ethylene, propylene, butene, pentene, hexene, heptene, octene, nonene, decene, undecene, dodecene and like α-olefins; 1,4-endomethylenecyclohexene and like bicyclo monomers; methyl (meth)acrylate, ethyl (meth) acrylate and like (meth)acrylates; vinyl acetate; maleic acid; and the like.

Catalysts useful for the production of the polymers include not only radical polymerization catalysts and Ziegler-Natta catalysts which are commonly employed in the art, but also catalyst systems comprising a catalyst prepared by depositing a transition metal compound (e.g., titanium halide such as titanium trichloride or titanium tetrachloride) on a support mainly composed of magnesium chloride or like magnesium halide, in combination with an alkyl aluminum compound (such as triethyl aluminum or diethyl aluminum chloride) and; said catalyst systems further comprising a specific ester compound and an organic ether compound; metallocene catalysts comprising a cyclopentadiene or its derivative and a metal of the fourth group such as titanium or zirconium; and said "metallocene catalysts further comprising methylalumoxane.

The melt flow rate (hereinafter referred to as "MI", measured according to JIS K 7210-1976) of the polyolefin-based resin for use in the invention can be suitably selected according to the molding method to be employed and physical properties required of the molded article. A recommended MI of the polyolefin resin is usually 0.01 to 200 g/10 min, preferably 0.05 to 100 g/10 min. The molecular weight distribution (Mw/Mn) of the resin is not limited, but is usually 1 to 10.

The polyolefin resin composition for use in the present invention may contain, where necessary, ethylene-propylene rubbers, SBR, hydrogenated SBR, SBS block copolymers, hydrogenated SBS block copolymers, hydrogenated styrene-isoprene (S-I) block copolymers hydrogenated S-I-S block copolymers and like rubbers, for the purpose of improving the low-temperature properties and impact resistance of the resin.

Furthermore, where necessary, talc, hydrotalcite, mica, zeolite, perlite, diatomaceous earth, calcium carbonate and aluminum hydroxy-bis-tert-butylbenzoate (shell nucleating agent), or like known rigidity-imparting nucleating agents or fillers can be added in an amount which does not adversely affect the effects of the present invention (e.g., up to about 50 wt. parts, in particular about 0.01 to 20 wt. parts, per 100 wt. parts of the polyolefin resin).

Mineral products such as talc, mica, perlite, diatomaceous earth and the like sometimes have acidic points on their surfaces, and if a system comprising the DBS compound of the formula (1) contains such a mineral product as a rigidity-imparting nucleating agent or filler in a large amount (e.g., 1 wt. part or more per 100 wt. parts of the polyolefin resin), the DBS compound may be decomposed by the acidity of the mineral product and may be inhibited from forming network-like crystals. Even if the DBS compound is not decomposed, the formation of network-like crystals of the DBS compound may sometimes be inhibited for some other reasons. For example, when a large amount of the above mineral product as a rigidity-imparting nucleating agent or a filler and the DBS compound are added to a molten polyolefin resin at the same time to prepare a polyolefin resin composition, the DBS compound may be decomposed, or may be inhibited from forming network-like crystals.

In such a case, the contemplated effects can be achieved by neutralizing the acidic points on the surface of the mineral product with KOH, NaOH or like alkaline compound and using the neutralized mineral product as the rigidity-imparting nucleating agent or filler. Alternatively, a polyolefin-based resin composition (preferably in the form of pellets) containing network-like crystals of the DBS compound is mixed with the mineral product as a rigidity-imparting nucleating agent or a filler, or with a polyolefin-based resin composition (preferably in the form of pellets) containing the mineral product, at a resin temperature not lower than the melting temperature of the polyolefin resin but not higher than $T_{fg}$,H of said polyolefin resin composition containing the network-like crystals, and the resulting mixture is molded in the same resin temperature. In these methods, a recommended proportion of the mineral product as a rigidity-imparting nucleating agent or a filler is usually up to 50 wt. parts, in particular about 1 to 20 wt. parts, per 100 wt. parts of the polyolefin resin.

Where necessary, the polyolefin resin composition for use in the invention may contain pigments. Various pigments including white pigments are usable, but color pigments are preferred. Examples of useful pigments include titanium oxide pigments (e.g., titanium dioxide, titanium yellow, titanium black, etc.), zinc oxide, chromium oxide, zinc sulfide, carbon black, iron oxide pigments (e.g., iron oxide, yellow oxide, red oxide, etc.), cadmium sulfide pigments (e.g., cadmium yellow, cadmium mercury red, etc.), barium sulfate, ultramarine, cobalt blue, phthalocyanine pigments (e.g., phthalocyanine green, phthalocyanine blue, etc.), isoindolinone pigments (e.g., isoindolinone yellow, isoindolinone red, etc.), azo pigments (e.g., permanent red F5R, pigment scarlet 3B, etc.), quinacridon pigments, anthrapyrimidine pigments (e.g., anthrapyrimidine yellow, etc.), benzidine pigments (e.g., benzidine orange GR, etc.), indanthrene pigments (e.g., indanthrene brilliant orange, etc.), manganese violet, and other known pigments.

The pigment is used in an amount that does not adversely affect the effects of the present invention. Generally, it is used in an amount less than 1 wt. part, in particular 0.01 to 1 wt. part, per 100 wt. parts of the polyolefin resin.

If the system contains, together with the DBS compound of the formula (1), the pigment in a large proportion of, for example, 1 wt. part or more per 100 wt. parts of the polyolefin resin, the formation of the DBS compound may be inhibited. For example, if said large amount of pigment and the DBS compound are added at the same time to a molten polyolefin resin to prepare a polyolefin resin composition, the formation of network-like crystals of the DBS compound is likely to be inhibited.

In such a case, the contemplated effects can be achieved by mixing a polyolefin-based resin composition (preferably in the form of pellets) containing network-like crystals of the DBS compound with any of the known pigments mentioned above or a polyolefin-based resin composition (preferably in the form of pellets) containing said pigment, at a temperature not lower than the melting temperature of the polyolefin resin but not higher than $T_{fg}$,H of said polyolefin resin composition containing the network-like crystals, and molding the resulting mixture. In this method, the pigment is preferably used in a proportion of up to about 5 wt. parts, in particular 0.01 to 5 wt. parts, per 100 wt. parts of the polyolefin resin.

The polyolefin resin composition for use in the present invention may contain other additives such as stabilizers, neutralizing agents, antistatic agents, lubricant, etc. These known additives may be used in combination, insofar as they are not adversely affect the effects of the invention.

Orientated gel molding method

A preferred embodiment of the orientated gel molding method of the present invention comprises the following steps (1) to (3):

(1) At least one DBS compound represented by the formula (1) (optionally together with one or more of the above additives such as alkaline compounds, pigments, etc.) is/are dispersed as uniformly as possible or dispersed on molecular level (dissolved) in a molten polyolefin resin. The temperature for dispersion or dissolution is, for example, 160 to 300° C. when a polypropylene-based resin is employed, or is for example 120 to 250° C. when a polyethylene-based resin is employed.

(2) Then, the system is cooled to a temperature not higher than $T_{fg}$,C thereof to form network-like crystals of the DBS compound of the formula (1). Specifically, $T_{fg}$,C is for example 210 to 125° C. when a polypropylene-based resin is employed, and is for example 210 to 120° C. when a polyethylene-based resin is employed. The higher the DBS compound concentration is, the higher $T_{fg}$,C becomes. The system may be further cooled to allow the resin composition to crystallize and made into pellets. In the pellets thus obtained, the network-like crystals of the DBS compound represented by the formula (1) are present.

(3) Subsequently, the molten resin is injected or extruded while maintaining the network-like crystals of the DBS compound at a temperature not lower than the melting temperature of the polyolefin resin but not higher than $T_{fg}$,H of the system, so that the network-like crystals are orientated.

When the resin composition containing network-like crystals of the DBS compound represented by the formula (1) is molded as mixed with a resin composition containing substances which inhibit the DBS compound from forming network-like crystals, such as rigidity-imparting nucleating agents, fillers and pigments, the two compositions are melted and mixed together at a temperature not lower than the melting temperature of the resin but not higher than $T_{fg}$,H of said resin composition containing the network-like crystals of the DBS compound. In the resulting melt, the DBS compound of the formula (1) retains the network-like crystal form. The melt is then injected or extruded while the network-like crystals of the DBS compound are retained at a resin temperature not higher than $T_{fg}$,H to thereby orientate the network-like crystals.

For example, the resin temperature in injection- or extrusion-molding the polypropylene resin composition is, for example, 160 to 230° C., preferably 170 to 210° C., more preferably 170 to 190° C.

For molding the polyethylene resin composition, the resin temperature is, for example, 120 to 230° C., preferably 130 to 210° C., more preferably 140 to 190° C.

In any case, it is important to set the resin temperature at a temperature not higher than $T_{fg}$,H of the system. Since $T_{fg}$,H varies in accordance with the make-up of the resin composition, it is necessary to determine $T_{fg}$,H of the resin composition in advance and then set the resin temperature for molding at a temperature not higher than $T_{fg}$,H.

The mold temperature or chill roll temperature set for this molding is, for example, 10 to 80° C.

A specific example of the orientated gel molding method of the invention will be described below.

When pellets of a polypropylene resin composition comprising 100 wt. parts of a polypropylene resin and 0.4 wt.

part of 1,3:2,4-bis-O-(4-methylbenzylidene)sorbitol (trade name "Gel All MD", product of New Japan Chemical Co., Ltd.) is injection-molded at various resin temperatures, and as the resin temperature decreases from 270° C. to 210° C., the flexural modulus of the resulting molded article increases gradually and linearly from 115 to 120 kg/mm², but the gradient of the increasing line is small. However, when the resin temperature approaches about 200° C., the gradient of the increasing line becomes steep, and the flexural modulus markedly increases to 132 kg/mm² or more. The orientated gel molding method of the invention is effectively applied at temperatures not higher than the temperature at which the flexural modulus remarkably increases.

Accordingly, when a polyolefin resin composition is molded by the orientated gel molding method in the resin temperature range in which network-like crystals of the DBS compound are present, the resulting molded article with orientated crystals has a rigidity at least 1.1 to 1.5 times that of isotropically crystallized polyolefin resin molded articles obtained by conventional methods.

Since $T_{fg}$, H becomes higher as the concentration of the DBS compound increases, the temperature range in which the orientated gel molding can be carried out expands toward higher temperatures with an increase in the DBS compound concentration. For example, $T_{fg}$,H of the above-mentioned system containing 0.4 wt. part of Gel All MD is 205° C., whereas $T_{fg}$,H of the system containing 0.8 wt. part of Gel All MD is 215° C. That is, the temperature range in which the orientated gel molding method can be carried out expands from a range of temperature not lower than the melting point of polypropylene and not higher than 205° C., to a range of temperature not lower than the melting point of polypropylene and not higher than 215° C.

The orientated gel molding method of the present invention can be widely applied to any molding methods comprising an injection or extrusion step. Specific examples of such methods include injection molding, extrusion molding, injection blow molding, injection extrusion blow molding, injection compression molding, extrusion blow molding, extrusion thermoforming, production of fibers by melt spinning, and the like.

Polyolefin-based resin molded article

The present invention also provides a polyolefin resin molded article obtainable by the above orientated gel molding method.

According to the orientated gel molding method of the invention, the polyolefin resin, when molded. crystallizes along the orientated network-like crystals of the DBS compound of the formula (1). Therefore, the polyolefin resin molded article obtained by the orientated gel molding method of the invention is characterized in that it comprises the DBS compound of the formula (1) and orientated crystals of the polyolefin resin.

The polyolefin resin molded article of the invention is applicable to fields in which high rigidity is required, such as automobile parts such as bumpers and steering wheels; materials for structural parts of electric appliances; containers for transport of beer bottles or harvest of agricultural and marine products; mechanical parts; parts of chemical apparatus; linings and the like.

The novel orientated gel molding method of the invention imparts excellent rigidity, moldability and surface gloss to the polyolefin resin molded article. These properties make it possible to reduce the thickness and weight of the molded article.

EXAMPLES

Examples and Comparative Examples are given below to illustrate the present invention in further detail. The properties of the obtained molded article were measured and evaluated by the following methods.

Sol-gel transition temperature during the cooling cycle $T_{fg}$,C (° C.) and sol-gel transition temperature during heating cycle $T_{fg}$,H (° C.)

The dynamic viscoelasticity test was performed using a dynamic viscoelasticity tester (product of RHEOLOGY Kabushiki Kaisha, MR-500) at a frequency of 1 Hz and a heating/cooling rate of 4° C./min in the shearing mode using parallel plates. Then, $T_{fg}$,C and $T_{fg}$,H were determined from the obtained temperature dependence curve of the storage shear modulus (G').

Flexural modulus (FM, kg/mm2)

The flexural modulus of five 4.0 mm thick test pieces (100 mm×10 mm) obtained by injection molding was determined according to JIS K 7203, and the average flexural modulus of the five test pieces was calculated. The greater the obtained value, the higher the rigidity of the molded article.

Gloss (GL, %)

The gloss was determined according to JIS K 6717.

Crystallization temperature of polyolefin resin molded article (Tc, ° C.)

Using DSC, the molded article was maintained at 250° C. for 4 minutes, and then cooled at a rate of 10° C./min to determine the exothermic peak temperature.

Wide-angle x-ray diffraction of polyolefin resin (WAXS)

Using an x-ray generator provided with an imaging plate detector, the diffraction patterns of the test piece observed from the following directions were obtained: Through direction [showing X-ray diffraction as observed from the z-axis direction when the machine direction (hereinafter "MD") of the test piece is defined as the y-axis direction, the Transverse Direction (transverse direction of the test piece, hereinafter "TD") is defined as the x-axis direction, and the Normal Direction (vertical direction of the test piece, hereinafter "ND") is defined as the z-axis direction]; Edge direction [showing X-ray diffraction as observed from the z-axis direction when defining MD (machine direction of the test piece) as the y-axis direction, TD (transverse direction of the test piece) as the z-axis direction, and ND (vertical of the test piece) as the x-axis direction]; and End direction [showing X-ray diffraction as observed from the direction of injection of the test piece, i.e., as observed from the z-axis direction when defining MD (machine direction of the test piece) as the z-axis direction, TD (transverse direction of the test piece) as the y-axis direction, and ND (vertical of the test piece) as the x-axis direction].

Example 1

Mixed together in powder forms were 100 wt. parts of block polypropylene (containing 4 wt. % of ethylene as a comonomer component, MI=30), 0.05 wt. parts of calcium stearate (an alkaline compound), 0.05 wt. part of Irganox 1010 (trade name, product of Ciba-Geigy), 0.05 wt. part of Irgafos 168 (trade name, product of Ciba-Geigy), 0.15 wt. part of stearyl monoglyceride and 0.4 wt. part of 1,3:2,4-bis-O-(3,4-dimethylbenzylidene)sorbitol. The mixture was melted by heating, extrusion-molded at a resin temperature of 255° C. The extrudate was water-cooled to room temperature, and cut into pellets.

Using the resulting gel pellets, test pieces were prepared by the orientated gel injection molding method in which the resin temperature was set to 180° C. and the mold temperature was set to 30° C. From temperature dependence of G' obtained from the dynamic viscoelasticity test, it was revealed that $T_{fg}$,C and $T_{fg}$,H of the system were found to be $T_{fg}$,C=185° C. and $T_{fg}$,H=204° C., respectively, indicating that network-like crystals of 1,3:2,4-bis-O-(3,4-dimethylbenzylidene)sorbitol were present in the molten resin at the resin temperature of 180° C. The molten resin was translucent at 180° C. because of light scattering. The test pieces were tested to determine the properties, and found to have a Tc of 128° C., an FM of 135 kg/mm$^2$, and a GL of 120%.

Figure 2:
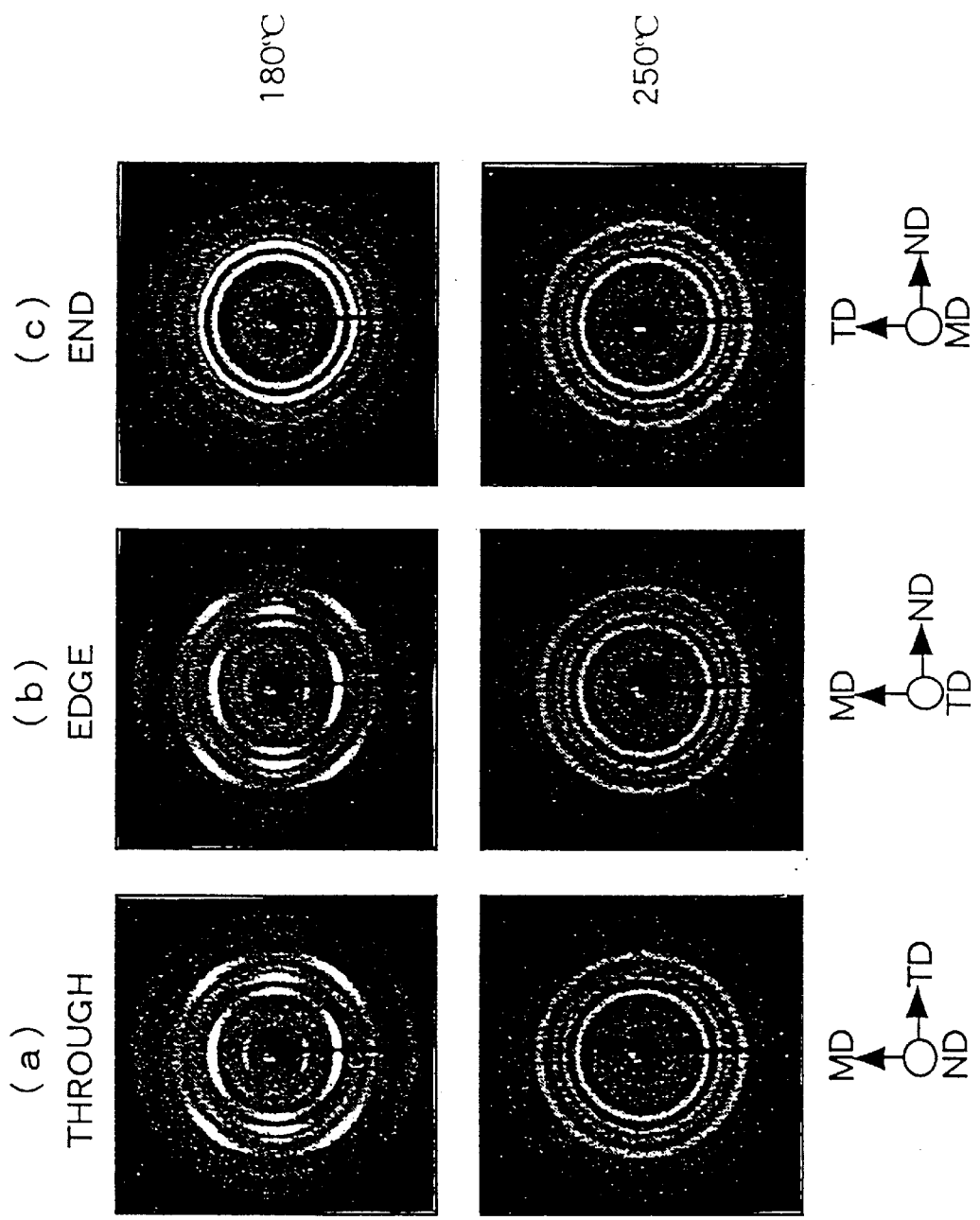
FIG. 2 shows two-dimensional wide-angle X-ray diffraction patterns of test pieces prepared by molding at a resin temperature of 180° C. (upper row) and 250° C. (lower row) in three directions [(a) THROUGH direction (thickness direction of the test piece), (b) EDGE direction (width direction of the test piece), and (c) END direction (flow direction of the resin)].

The diffraction patterns in the Through, Edge and End directions were obtained by wide-angle x-ray diffraction of the test pieces (FIG. 2, the resin temperature during molding: 180° C.). The diffraction images in the Through and Edge directions showed similar arcuate Debye rings, whereas the diffraction image in the End direction showed an isotropic Debye ring (axial orientation and symmetrical in the End direction). The above facts revealed that the crystal axes of the block polypropylene crystals were orientated in the direction of the resin flow.

Example 2

Test pieces were prepared by following the procedure of Example 1 with the exception of using 0.05 wt. part of lithium stearate in place of calcium stearate. This system had a $T_{fg}$,H of 207° C., indicating that network-like crystals were present in the molten resin at the resin temperature of 180° C. Further, the test pieces were tested to determine the properties, and found to have a Tc of 129° C., an FM of 139 kg/mm$^2$, and a GL of 120%.

Example 3

Test pieces were prepared by following the procedure of Example 1 with the exception of adding 1.0 wt. part of sodium benzoate, together with the other additives. This system had a $T_{fg}$,H of 205° C. The test pieces were tested to determine the properties, and found to have a Tc of 129° C., an FM of 140 kg/mm$^2$, and a GL of 120%.

Example 4

50 g of talc and 1.0 g of KOH were stirred in 300 ml of water at 100° C. for 1 hour. The mixture was filtered, and the talc was dried. Test pieces were prepared by following the procedure of Example 1 with the exception of adding 10 wt. parts of the obtained alkali-treated talc, together with the other additives. This system had a $T_{fg}$,H of 205° C. The test pieces were tested to determine the properties, and found to have a Tc of 129° C., an FM of 160 kg/mm$^2$, and a GL of 100%.

Example 5

Gel pellets A were prepared by following the procedure of Example 1 with the exception that the amount of 1,3:2,4-bis-O-(3,4-dimethylbenzylidene)sorbitol was changed to 0.8 wt. part. The gel pellets A had a $T_{fg}$,H of 216° C.

Furthermore, mica-containing pellets B were prepared by following the procedure of Example 1 with the exception of using 10 wt. parts of mica powder in place of 1,3:2,4-bis-O-(3,4-dimethylbenzylidene)sorbitol.

The gel pellets A and mica-containing pellets B were mixed together in a weight ratio of 1/1.09. Test pieces were prepared from the mixed pellets by the orientated gel injection molding method in which the resin temperature was set to 180° C. and the mold temperature was set to 30° C. The test pieces were tested to determine the properties, and found to have a Tc of 128° C., an FM of 150 kg/mm$^2$, and a GL of 120%.

Comparative Example 1

Test pieces were prepared by following the procedure of Example 1 with the exception of adding 5.0 wt. parts of mica powder, together with the other additives.

In this system, 1,3:2,4-bis-O-(3,4-dimethylbenzylidene)sorbitol did not form network-like crystals, presumably because it had been hydrolyzed by the influence of a large amount (5.0 wt. parts) of mica powder. As the result, this system did not have a $T_{fg}$,H, as revealed by the dynamic viscoelasticity test. The test pieces were tested to determine the properties, and found to have a Tc of 120° C., an FM of 120 kg/mm$^2$, and a GL of 100%.

Example 6

Titanium oxide-containing pellets C were prepared by following the procedure of Example 1 with the exception of using 1.0 wt. part of titanium oxide in place of 1,3:2,4-bis-O-(3,4-dimethylbenzylidene)sorbitol.

The gel pellets A obtained in Example 5 and the titanium oxide-containing pellets C were mixed together in a weight ratio of 1/1. Test pieces were prepared from the mixed pellets by the orientated gel injection molding method in which the resin temperature was set to 180° C. and the mold temperature was set to 30° C. The test pieces were tested to determine the properties, and found to have a Tc of 128° C., an FM of 140 kg/mm$^2$, and a GL of 120%.

Comparative Example 2

Test pieces were prepared by following the procedure of Example 1 with the exception of not using a nucleating agent 1,3:2,4-bis-O-(3,4-dimethylbenzylidene)sorbitol. The test pieces were tested to determine the properties, and found to have a Tc of 102° C., an FM of 94 kg/mm$^2$, and a GL of 82%.

Comparative Example 3

Test pieces were prepared from the pellets obtained in Example 1 by a conventional injection molding method in which the resin temperature was set to 250° C. and the mold temperature was set to 30° C. The temperature dependence curve of G' obtained by the dynamic viscoelasticity test revealed that $T_{fg}$,C and $T_{fg}$,H of the system were $T_{fg}$,C=185° C. and $T_{fg}$,H=204° C., respectively. That is, the network-like crystals were eliminated at the resin temperature of 250° C.

The test pieces were tested to determine the properties, and found to have a Tc of 128° C., an FM of 120 kg/mm$^2$ and a GL of 120%. Since the resin temperature is in the sol temperature range, network-like crystals of the DBS compound once formed were eliminated. As the result, the molten resin at the nozzle of the molding machine was transparent because of the absence of light scattering.

Further, all of the diffraction patterns in the Through, Edge and End directions obtained by the wide-angle x-ray diffraction (FIG. 2, the resin temperature during molding: 250° C.) showed isotropic Debye rings, indicating that the block polypropylene formed isotropic crystals.

Comparative Example 4

Test pieces were prepared by following the procedure of Example 1 with the exception of using 0.4 phr of an organic phosphoric acid ester salt nucleating agent (trade name "NA11", product of Adeka Argus Chemical Co., Ltd.) in place of the nucleating agent 1,3:2,4-bis-O-(3,4-dimethylbenzylidene)sorbitol. The test pieces were tested to determine the properties, and found to have a Tc of 125° C., an FM of 130 kg/mm$^2$ and a GL of 110° C.

Comparative Example 5

Test pieces were prepared by following the procedure of Example 1 with the exception of using 0.4 phr of an organic phosphoric acid ester salt nucleating agent (trade name INA11", product of Adeka Argus Chemical Co., Ltd.) in place of 1,3:2,4-bis-O-(3,4-dimethylbenzylidene)sorbitol and employing a conventional injection molding method in which the resin temperature was set to 250° C. and the mold temperature was set to 30° C. The test pieces were tested to determine the properties, and found to have a Tc of 125° C., an FM of 128 kg/mm², and a GL of 115%.

Example 7

Test pieces were prepared from the pellets obtained in Example 1, by the orientated gel injection molding method in which the resin temperature was set to 170° C. and the mold temperature was set to 30° C. The test pieces were tested to determine the properties, and found to have a Tc of 128° C. and an FM of 140 kg/mm² and a GL of 120%.

Example 8

Test pieces were prepared by following the procedure of Example 1 with the exception of using a nucleating agent 1,3:2,4-bis-O-(2,4-dimethylbenzylidene)sorbitol in place of the nucleating agent 1,3:2,4-bis-O-(3,4-dimethylbenzylidene)sorbitol. This system had a Tc of 183° C. and a $T_{fg}$,H of 203° C., indicating that network-like crystals were present in the molten resin at the resin temperature of 180° C. The test pieces were tested to determine the properties, and found to have a Tc of 128° C. and an FM of 135 kg/mm² and a GL of 118%.

Example 9

Test pieces were prepared by following the procedure of Example 1 with the exception of using a nucleating agent 1,3:2,4-bis-O-(4-methylbenzylidene)sorbitol in place of the nucleating agent 1,3:2,4-bis-O-(3,4-dimethylbenzylidene) sorbitol. This system had a $T_{fg}$,C of 184° C. and a $T_{fg}$,H of 205° C., indicating that network-like crystals were present in the molten resin at the resin temperature of 180° C. The test pieces were tested to determine the properties, and found to have a Tc of 128° C. and an FM of 132 kg/mm² and a GL of 120%.

Comparative Example 6

Test pieces were prepared from the pellets obtained in Example 9, by a conventional injection molding method in which the resin temperature was set to 250° C. and the mold temperature was set to 30° C. The test pieces were tested to determine the properties, and found to have a Tc of 128° C. and an FM of 122 kg/mm², and a GL of 120%.

Example 10

Test pieces were prepared by following the procedure of Example 9 with the exception of adding, together with the other additives, 0.02 wt. part of polyoxyethylene alkyl ether wherein the alkyl group had 18 carbon atoms and wherein the number of moles of ethylene oxide added was 30. This system had a $T_{fg}$,H of 205° C. The test pieces were tested to determine the properties, and found to have a Tc of 128° C., an FM of 138 kg/mm², and a GL of 120%.

Example 11

10 g of 1,3:2,4-bis-O-(4-methylbenzylidene)sorbitol (melting point: 264° C.) and 0.01 g of sodium lauryl sulfate (melting point depressing agent) were stirred in 200 ml of methanol at 60° C. for 2 hours, so as to fully swell 1,3:2,4-bis-O-(4-methylbenzylidene)sorbitol and uniformly disperse the melting point depressing agent therein. While stirring the resulting slurry, methanol was evaporated off under reduced pressure, giving 1,3:2,4-bis-O-(4-methylbenzylidene)sorbitol having a depressed melting point (210° C.).

Test pieces were prepared by following the procedure of Example 9 with the exception of using the above obtained 1,3:2,4-bis-O-(4-methylbenzylidene)sorbitol having a depressed melting point. This system had a $T_{fg}$,H of 205° C. The test pieces were tested to determine the properties, and found to have a Tc of 128° C., an FM of 134 kg/mm², and a GL of 120%.

Example 12

Test pieces were prepared by following the procedure of Example 1 with the exception of using a nucleating agent 1,3:2,4-bis-O-(4-ethylbenzylidene)sorbitol in place of 1,3:2,4-bis-O-(3,4-dimethylbenzylidene)sorbitol. This system had a $T_{fg}$,C of 183° C. and a $T_{fg}$,H of 204° C., indicating that network-like crystals of the nucleating agent were present in the molten resin at the resin temperature of 180° C. The test pieces were tested to determine the properties, and found to have a Tc of 126° C., an FM of 130 kg/mm², and a GL of 120%.

Example 13

Test pieces were prepared by following the procedure of Example 1 with the exception of using a nucleating agent 1,3:2,4-bis-O-(tetrahydro-naphthylidene) sorbitol in place of 1,3:2,4-bis-O-(3,4-dimethylbenzylidene)sorbitol. This system had a $T_{fg}$,H of 184° C. and a $T_{fg}$,C of 205° C., indicating that network-like crystals of the nucleating agent were present in the molten resin at the resin temperature of 180° C.

The test pieces were tested to determine the properties, and found to have a Tc of 125° C., an FM of 132 kg/mm², and a GL of 117%.

What is claimed is:

1. An orientated gel molding method of a polyolefin-based resin composition, the method comprising dissolving at least one dibenzylidene sorbitol compound represented by the following formula (1) in a molten polyolefin resin.

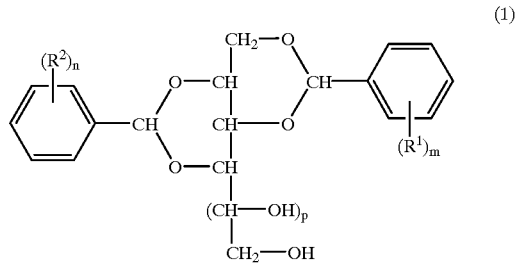

wherein $R^1$ and $R^2$ are the same or different, and each represent a hydrogen atom, a $C_1$–$C_4$ alkyl group, a $C_1$–$C_4$ alkoxy group or a halogen atom; m and n each represent 1 to 5; p is 0 or 1; when m is 2, the two $R^1$'s may optionally be taken together with the benzene ring to which they are attached to form a tetralin ring; and when n is 2, the two $R^2$'s may optionally be taken together with the benzene ring to which they are attached to form a tetralin ring, cooling the molten resin to a temperature not higher than the sol-gel transition temperature during the cooling cycle to give a polyolefin resin composition containing a network of crystals of the dibenzylidene sorbitol compound, and molding said resin composition at a resin temperature not lower than the melting temperature of the polyolefin resin but not higher than the sol-gel transition temperature during the heating cycle.

2. An orientated gel molding method of a polyolefin-based resin composition according to claim 1 wherein the polyolefin resin composition containing a network of crystals of the dibenzylidene sorbitol compound represented by the formula (1) is in the form of pellets.

3. An orientated gel molding method of a polyolefin-based resin composition according to claim 1 wherein the polyolefin-based resin composition further contains at least one alkaline compound.

4. An orientated gel molding method of a polyolefin-based resin composition according to claim 1 wherein the polyolefin-based resin composition further contains at least one nonionic surfactant and/or anionic surfactant.

5. An orientated gel molding method of a polyolefin-based resin composition according to claim 4 wherein the nonionic surfactant and/or anionic surfactant is at least one surfactant selected from the group consisting of sodium salts or potassium salts of polyoxyethylene (4 to 50 moles) alkyl ($C_{12}$ to $C_{22}$) ethers, polyoxyethylene (4 to 50 moles) glycerine fatty acid ($C_8$ to $C_{22}$) esters, fatty acid ($C_8$ to $C_{22}$) monoglycerides, fatty acid ($C_8$ to $C_{22}$) monoalkanol ($C_1$ to $C_4$) amides, fatty acid ($C_8$ to $C_{22}$) dialkanol ($C_1$ to $C_4$) amides and N-acyl ($C_8$ to $C_{22}$) glutamic acids.

6. An orientated gel molding method of a polyolefin-based resin composition according to claim 1 wherein the molten polyolefin resin composition containing the network of crystals further contains at least one rigidity-imparting nucleating agent selected from the group consisting of talc, hydrotalcite, mica, zeolite, perlite, diatomaceous earth, calcium carbonate and aluminum hydroxy-bis-tert-butylbenzoate.

7. An orientated gel molding method of a polyolefin-based resin composition according to claim 2 characterized by the steps of mixing a polyolefin-based resin composition containing a network of crystals of at least one dibenzylidene sorbitol represented by the formula (1) with at least one rigidity-imparting nucleating agent selected from the group consisting of talc, hydrotalcite, mica, zeolite, perlite, diatomaceous earth, calcium carbonate and aluminum hydroxy-bis-tert-butylbenzoate, or with a polyolefin-based resin composition containing said at least one rigidity-imparting nucleating agent, at a resin temperature within the range of not lower than the melting temperature of the polyolefin resin but not higher than the sol-gel transition temperature during the heating cycle of said polyolefin-based resin composition containing the network of crystals; and molding the resulting mixture at a resin temperature in the above range.

8. An orientated gel molding method of a polyolefin-based resin composition according to claim 1 wherein the molten polyolefin resin composition containing the network of crystals further contains a pigment.

9. An orientated gel molding method of a polyolefin-based resin composition according to claim 1 characterized by the steps of mixing a polyolefin-based resin composition containing a network of crystals of at least one dibenzylidene sorbitol compound represented by the formula (1) with a pigment or a polyolefin-based resin composition containing a pigment, at a temperature within the range of not lower than the melting temperature of the polyolefin resin but not higher than the sol-gel transition temperature during the heating cycle of said polyolefin resin composition containing the network of crystals; and molding the resulting mixture at a resin temperature in the above range.

10. An orientated gel molding method of a polyolefin-based resin composition according to claim 8 wherein the pigment is at least one member selected from the group consisting of titanium oxide pigments, zinc oxide, chromium oxide, zinc sulfide, carbon black, iron oxide pigments, cadmium sulfide pigments, barium sulfate, ultramarine, cobalt blue, phthalocyanine pigments, isoindolinone pigments, azo pigments, quinacridone pigments, anthrapyrimidine pigments, benzidine pigments, indanthrene pigments and manganese violet.

11. An orientated gel molding method of a polyolefin-based resin composition according to claim 1 wherein the molten polyolefin resin composition containing the network of crystals is molded by a molding method comprising an injection or extrusion step.

12. An orientated gel molding method according to claim 11 wherein the molding method comprising an injection or extrusion step is injection molding, extrusion molding, injection blow molding, injection extrusion blow molding, injection compression molding, extrusion blow molding, extrusion themoforming and melt spinning.

13. An orientated gel molding method of a polyolefin-based resin composition according to claim 1 wherein the dibenzylidene sorbitol compound represented by the formula (1) is at least one member selected from the group consisting of 1,3:2,4-bis-O-(3,4-dimethylenzylidene) sorbitol, 1,3:2,4-bis-O-(2,4-dimethylenzylidene)sorbitol, 1,3:2,4-bis-O-(4-methylbenzylidene) sorbitol, 1,3:2,4-bis-O-(4-ethylbenzylidene)sorbitol, 1,3:2,4-bis-O-(4-chlorobenzylidene)sorbitol, 1,3:2,4-bis-O-(2,4,5-trimethylbenzylidene)sorbitol and 1,3:2,4-bis-O-(tetrahydronaphthylidene)sorbitol.

14. An orientated gel molding method of a polyolefin-based resin composition according to claim 1 wherein the dibenzylidene sorbitol represented by the formula (1) has a melting point depressed by at least 10° C. but less than 120° C. by a melting point depressing agent.

15. An orientated gel molding method of a polyolefin-based resin composition according to claim 14 wherein the melting point depressing agent is at least one member selected from the group consisting of hydroxypolycarboxylic acids, carboxylic acids, sulfonic acid salts, sulfuric acid ester salts and fatty acid aluminum salts.

16. An orientated gel molding method of a polyolefin-based resin composition according to claim 1 wherein the polyolefin resin is at least one member selected from propylene homopolymers and propylene copolymers.

* * * * *

UNITED STATES PATENT AND TRADEMARK OFFICE
CERTIFICATE OF CORRECTION

PATENT NO.     : 6,238,615 B1
DATED          : May 29, 2001
INVENTOR(S)    : Kobayashi et al.

It is certified that error appears in the above-identified patent and that said Letters Patent is hereby corrected as shown below:

Title page,
Item (30), change "Sep. 19, 1998 (JP).......10-271056" to
-- Sep. 25, 1998 (JP)    ......10-271056" --.

Signed and Sealed this

Eighth Day of January, 2002

Attest:

JAMES E. ROGAN
Attesting Officer     Director of the United States Patent and Trademark Office